UNITED STATES PATENT OFFICE.

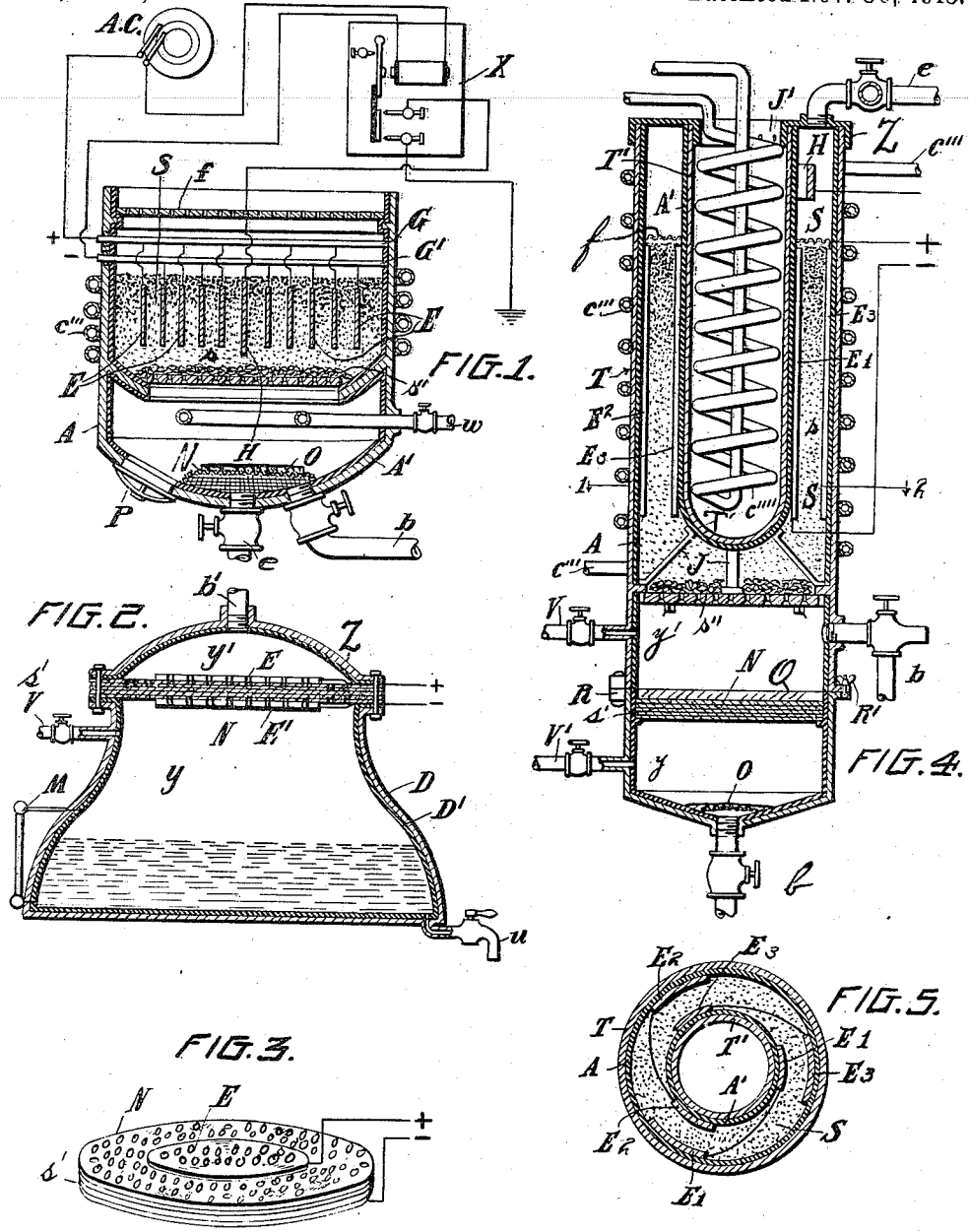

JACOB E. BLOOM, OF BROOKLYN, NEW YORK.

PROCESS AND APPARATUS FOR THE ELECTRICAL TREATMENT OF LIQUIDS AND FLUIDS, AND THE PRODUCTS RESULTING THEREFROM.

1,162,213.   Specification of Letters Patent.   Patented Nov. 30, 1915.

Application filed March 31, 1915. Serial No. 18,325.

*To all whom it may concern:*

Be it known that I, JACOB E. BLOOM, a citizen of the United States, residing at Brooklyn, city of New York, in the county of Kings and State of New York, have invented certain new and useful Improvements in Processes and Apparatus for the Electrical Treatment of Liquids and Fluids, and the Products Resulting Therefrom, of which the following is a specification.

This invention relates to the treatment by electrical and adsorption means, of liquids or fluids, and particularly aqueous or alcoholic or combined aqueous and alcoholic liquids, such as beer, malt extracts, and the like, and with the object of removing therefrom certain adsorbable colloidal impurities or constituents such as turbidity or sediment-forming colloids, which are not removed by ordinary filtration, and to give to the resulting liquids new and valuable properties.

This application is in part a continuation with improvements of my application for U. S. Patent, Serial No. 842327, filed June 1st, 1914.

This invention comprises certain novel forms and constructions of apparatus, as well as novel methods or processes of treatment, and the novel products resulting from such treatment.

As a process, my invention comprises a process of treating liquids or fluids, such as those referred to herein by subjecting the same to the influence of an alternating electric field or a magnetic field, or an alternating field from A. C. source, or a combination thereof, under control as to voltage and frequency and amperage, in the presence of a mass of a suitable comminuted solid, insoluble electrically-acting adsorption material, advantageously and preferably a dielectric, the liquid or fluid being passed intermittently or continuously through the interstices of said adsorption material in the electric field, under regulated temperature and pressure; and being advantageously maintained during and after treatment in an insulated or non-conducting container or receptacle or conduit.

As an apparatus, my invention comprises a mass of a suitable comminuted solid, insoluble or inert adsorption material, advantageously dielectric and electrically-active in a chamber of a suitable container such as an insulating or non-conducting vessel, or receptacle, together with means for supplying and removing from said chamber, either intermittently or continuously, a liquid or fluid, to be treated, and means for controlling the rapidity of such passage when continuous; and means for producing and maintaining in said mass and chamber and the liquid or fluid therein or passing therethrough, a suitable alternating electric field such as a magnetic or electromagnetic field, a magneto-electric field, and electrostatic field and the like, with means of control thereof; and with regulable means of attemperating the said chamber and liquids and material to any desired temperature.

As a product, my invention comprises the novel stabilized liquid or fluid resulting from such treatment, said product containing therein, in a state of electrification or with an enhanced electric charge or adsorbed ions, colloidal constituents (particularly sundry emulsoids) which are non-adsorbable or not permanently adsorbable (being first adsorbed and then electrostatically repulsed) by the comminuted adsorption material under the influence of the alternating electric field, and said product being substantially free from, or containing to a materially decreased extent, colloidal constituents, particularly suspensoids, adsorbable by such adsorption material, under such influence; said product in some cases, as in the case of beer or fermented beverages containing the valuable assimilable emulsoids or non-adsorbable or amphoteric colloidal constituents, in stable equilibrium due to such charges, or state of electrification, but being relatively or substantially free from the adsorbable or suspended colloidal constituents, such as are the turbidity and sediment-forming colloids of beer, ale, and the like.

The invention as thus briefly outlined will be hereinafter more fully set forth.

In the ordinary purification processes applied to beverages, such as beer, ale, etc., or to aqueous or alcoholic solutions or extracts of various substances, the coarser and heavier particles in suspension contained therein, are readily removed by filtration, but the removal of the finer particles, particularly the particles of colloidal nature, in colloidal solution or state, is difficult to effect. Moreover some colloidal constituents, especially emulsoids, are often valuable and should be retained in solution, while others should be removed. Ordinary filtration processes are in some cases effective in removing certain colloids, but in general all colloids including those which it is desirable to retain are indiscriminately removed. Chemical precipitation processes have been proposed for the purpose of coagulating and throwing out of solution and thus removing such colloids, but such processes also tend to remove all colloids, including the valuable more permanent emulsoid colloids, and moreover such chemicals may contaminate the liquids, and dilute them. In the case of certain liquids and fluids it frequently happens that after the most careful purification and filtration processes, there occur subsequent separation of colloids causing turbidity or sediment, particularly in the case of beverages and extracts such as beer, and contains appreciable amounts of colloidal constituents of an emulsoid nature after the fermentation. It is desirable that these emulsoid colloids which in many cases have valuable nutritive or tonic properties should be retained and kept from precipitation, while the undesirable colloids of a suspensoid nature should be removed.

The present invention relates to the treatment of such liquids or fluids in order to effect the selective purification referred to, where constituents capable of being separated in this way are present.

It further relates to the treatment of liquids and fluids, generally containing colloidal constituents together with non-adsorbable or amphoteric constituents, in order to remove and separate or adsorb such adsorbable constituents.
I have found that if a liquid or fluid containing adsorbable colloidal constituents is subjected to the influence of an alternating electric field in the presence of a suitable comminuted adsorption material, it is possible to adsorb upon such material, adsorbable colloidal constituents and to otherwise promote the flocculation or precipitation or coagulation or aggregation of suspensoids and turbidity-causing particles, including such as metallic or inorganic and organic colloids, colloidal solutions of copper or iron or other metal hydroxids, amorphous matter, albumens and proteins coagulating spontaneously, certain nucleo-proteins, globulins, gluten-turbidity causing particles, the complex proteins and substances ordinarily found in "cooler sludge" or deposited in trade casks and bottles, etc.,—while nevertheless retaining in solution in the liquid or fluid certain valuable colloidal constituents of an emulsoid or amphoteric nature, the process thus effecting a selective purification in a particularly advantageous manner.

I use the term alternating electric field to refer to and include various fields obtainable from alternating current source, preferably symmetrical, or of an alternating nature obtained from other current source, such as the field induced by an electro-magnet or an electromagnetic coil, or by a magneto-electric coil, or by electrostatically charged electrodes or by an electrostatic field or other induced field; or by an alternating current between electrodes or terminals immersed in the liquids or fluids; and the like.

For aqueous liquids, and other liquids of a similar nature, alternations of low frequency are usually more advantageous in induced fields. For heavy oils such as cotton-seed, etc., and blends of oils and fats, and more viscous solutions such as glycerin or sugar syrup, a current of very much higher frequency and voltage is more advantageous. It will be understood that the nature of the current and its voltage can be varied within rather wide limits, so long as the alternating field of suitable character is obtained.

With beer and most liquids I prefer a medium frequency and low density of current and symmetrical currents for the system of apparatus herein illustrated, i. e. where alternating current is passed between electrodes immersed in the vessel and liquid;
with such the current frequency and current density should be such as to avoid any substantial electrolysis at the electrodes. If the frequency and density do not avoid such electrolysis then the frequency or density or both should be increased or decreased until there is no electrolysis. On the other hand where the induced electric fields are used as illustrated in the apparatus in my aforesaid prior application I advantageously use the low frequency of 16 or 25 or 60 cycles. By medium frequencies I mean from 100 to about 1,500 cycles. By high frequency I mean such as is used with wireless telegraphy.

For my electrodes herein, which must be of insoluble materials, I advantageously use platinum or carbon for acid and neutral solutions, liquids and fluids, and iron for alkaline.

As adsorption materials, there can be used many solid, insoluble and inert materials, advantageously dielectric but electrically-acting when immersed in the liquid or fluid, and having a conductivity less than that of the liquid or fluid. The adsorption material should be relatively speaking a non-conductor but itself advantageously capable of being charged or have electrostatic capacity and should advantageously be complementary to the colloids or particles which it is desired to adsorb. That is to say, where in solution, the adsorbable or suspensoid colloids are normally electronegative, (they are generally such), the adsorption material should advantageously be electropositive; vice versa.

One practical guide to follow as regards whether to use an electropositive or electronegative adsorption material, with any organic compound in solution to be treated is the following; wherever in said solution in an electrolytic cell, i. e., with direct current through the solution between electrodes, the colloid or particle would be disengaged at or migrate toward the anode, it is electronegative; and then I use my process with an electropositive adsorption material to attain colloid precipitation without addition of extraneous chemicals or electrolytes which might be detrimental in foods, oils, beverages, pharmaceutical preparations, and the like. Again, in solutions where the colloid or particle would be disengaged at or would migrate toward the cathode, in an electrolytic cell, with a direct current, there it is electropositive; and there I use my process with an electronegative adsorption material to attain colloid precipitation, without addition of extraneous chemicals. I prefer to use as an electropositive adsorption material in conjunction with the alternating electric field, a large mass of comminuted solid corundum or crushed abrasive garnet i. e., of 16 to 30 mesh; and I prefer comminuted solid pure quartz of about the same mesh as an electronegative adsorption material. I apply the term "suitable" adsorption material as indicative of its said property, i. e., being electropositive to adsorb "negative" colloids; and vice versa. The adsorption material should be in a suitable state of comminution, advantageously coarse, e. g. 16 to 30 mesh, and should advantageously be of a crystalline nature. Among the materials which may be included as adsorption materials, may be mentioned pure quartz, and particularly the purer forms of silica sand; some forms of glass; abrasive garnet; corundum; crystalline carborundum; zeolite; kaolin, preferably of scale like crystalline form; emery; asbestos, etc. Also crushed granulated glass; "stoneware"; porcelain; and mica; also sundry mineral fibers such as asbestos thread, woven asbestos fabric, glass wool, etc. Also fullers' earth; talc; infusorial silica; kieselguhr; sundry types of tripoli, meaning the light porous silicious rock, crushed, from which the calcareous material has been leached; pumice or lava having a loose spongy or cellular structure; rottenstone, a crushed silicious limestone from which the calcareous part has been wholly removed, etc.

When the liquid containing the adsorbable colloids is subjected to the influence of the alternating electric field in the presence of the adsorption material, this material being itself charged by immersion, will attract colloidal particles carrying an opposite electric charge, and repel those carrying the same electric charge. Colloidal particles of an amphoteric nature, such as the emulsoid colloids, are capable of changing their charge so that if first attracted to the adsorption material, they will upon contact have their charges neutralized and be then charged oppositely and repelled; or de-adsorbed; while suspensoid colloids, which are not amphoteric and generally negative will be in general attracted to the adsorption material and upon contact will have their charges neutralized and will remain or be adsorbed by or upon the adsorption material. The alternating nature of the field causes a rapid to and fro movement of the colloid particles and the charging of the latter from adjoining ions and favorably influences the adsorption process.

As a result of this process, the liquid or fluid treated is freed from a greater or less amount of its adsorbable colloidal constituents, while the non-adsorbable constituents such as the amphoteric colloids and colloids not adsorbable under the particular conditions of the treatment remain in the liquid. Where the liquid contains adsorbable colloids in part normally electro-negative and in part electro-positive, or amphoteric, it is advantageous to subject the material first to the adsorption action of a material normally electro-positive and then to the action of a material normally electro-negative; whereby a larger proportion of the colloids are adsorbed, etc.

Where the liquid treated contains non-adsorbable colloids such as the amphoteric or emulsoid colloids, the treated liquid will have been not only freed by the above process from part or all of its suspensoid or adsorbable and non-reversible colloids, but it still retains in a particularly advantageous condition, said repulsed or non-adsorbed or de-adsorbed amphoteric particles, since these colloids as the result of the treatment have adsorbed ions or have been given an electric charge or an enhanced electric charge so that the liquid as a whole is electrically charged and thereby stabilized and made to contain colloids of a particular nature with enhanced charge.

In the case of liquids containing spontaneously coagulable colloids such as some of the albumens, the treatment of the present invention results in the coagulation and precipitation or aggregation or flocculation or adsorption of such colloids, and hence their removal as aforesaid; while the more permanent emulsoid colloids will be relatively less affected. It will be understood that colloids and other particles may also be concentrated, aggregated, flocculated, coagulated or precipitated in the liquid or fluid by the influence of the electric field and that such substances may be also thus removed by the adsorption material, acting like a mere mechanical filtering medium, in addition to the colloids which are adsorbed. Furthermore, there may be additional concentrations, aggregations, flocculations, coagulations or precipitations of said particles—and enhanced charges upon other particles continuing in solution due to the meeting of said particles, influenced by said alternating field, at the interface of the solid adsorption material with its charges due to immersion.

In order to retain upon the emulsoid colloids and other amphoteric particles in solution the electric charge to keep the same in stable solution, I advantageously use an inert electrode, preferably a platinum plate, within the interior of the vessel leading to the adsorption material, in contact with the passing liquid or fluid therein or with the liquid in pipe or conduit en route thereto, or therefrom, or wherever it is a continuation of the fluid in the adsorption vessel, and distant from or beyond the influence of the electric field; and which plate is in electrical connection with an insulated ground wire having an insulated exterior interrupter which automatically breaks the earth connection with each cycle of the alternating current used in the process,—and preferably breaking connection with the negative alternation where the adsorption material is electropositive,—and with such positive alternation where said material is electronegative.

In some cases of liquids and fluids,—generally other than beverages,—it is an object to remove and obtain from the liquid not only the suspensoids but also the emulsoids, i. e. practically all colloids, both amphoteric and otherwise; this I accomplish, by using my same apparatus and process with supplemental treatment by passage through a mechanically-acting solid insoluble adsorption material,—advantageously under non-insulated conditions; such material being most advantageously a pure cellulose, preferably a mass of cotton fiber or numerous surfaces of cotton cloth,—or a mass of charcoal preferably animal charcoal. The precipitates, coagulations, flocculations, aggregates, adsorptions and the like, found on such cellulose after such passage as well as those found on the prior adsorption material, can be readily gathered as concentrates together or separately, and in the manner now practised in chemical laboratories in gathering such from ordinary filtrations; e. g. by burning the cellulose.

The process of the present invention, which is more particularly described in its application to beer and other products from "malt", such as "malt extract", is also of general application for liquids and fluids, such as: beverages including cider, whisky, spirits, brandy, cordials; vinegar; and milk and liquid milk products; mineral waters; pharmaceutical liquid preparations, decoctions, extracts; liquid coffee and tea; bacteriological preparations, especially serums and vaccins; water purification; syrups, honey, molasses; aqueous and alcoholic manufactures, liquid blends and extracts; organic compounds such as turpentine oil; ferments; yeast; colloidal solutions of dyes and dyestuff compounds; hydrogenated products where catalysts have been used; oils, fats and fatty acids and blends and waxes in liquid state; mineral solutions of liquids and fluids from ores and generally in the refining of sugar juices, such as cane or beet juices, etc., and in the concentration of liquids; in condensation of fluids; also of glazes and the like in ceramics; and in "salting out" of liquids but without salt; in purifying liquids; also of emulsions to aggregate and obtain the colloids therefrom; and other liquids and solid substances capable of innocuous conversion to liquid state and vice versa, and containing colloidal constituents adsorbable under the influence of the adsorption material; also for liquids prior to and after the alcoholic or acetic or lactic fermentation thereof. Beer and the like capable of this treatment comprise mostly water, with dilute solutions of electrolytes and of non-electrolytes, including emulsoid colloids which are non-adsorbable (permanently) and colloids which are adsorbable, but are not electrolytes; and including albuminoids, proteins, organic acids or alkali or salt solutions, mineral substances, mucilaginous substances, pectins, and electro-indifferent substances such as sugar and alcohol. Beer and the like also contains fermented and unfermented extractive matters; protozoa; bacteria, yeast, etc.; and amorphous matters from the vessels and conduits used in the manufactures.

In the art of brewing I interpolate my electric adsorption treatment as an additional process, advantageously at the three following present manufacturing stages (1) and (2) and (3) below, or after the latter two only or after the fermentation only, and prior to packaging in trade barrels, casks, or bottles, towit:

(1): Before mixing and boiling the mash or wort with hops in the "copper kettles," i. e. when the mash has been completed and when there is present therein an excess of active diastase (whose activity in further converting starch into sugar it is desired to stop), there, in lieu of using what is known as the "underback", I substitute my said process advantageously at temperature of about 130 degrees F., to remove said diastase and otherwise remove amorphous substances from the "mash".

(2): After the boiling of the hopped wort, I use my process advantageously at about 130 degrees F. A well boiled hopped wort, i. e. before the fermentation, which filters quite bright from the hop-back, always becomes more or less turbid when cooled, to fermentation temperature. This turbidity is due to the suspension of very finely divided amorphous particles which are quite separate from each other and are roughly spherical in shape. When a wort turbid from this finely divided amorphous matter is fermented with yeast, little or no change is produced in the suspended matter, either in appearance or its state of aggregation and the fermented liquid shows the same resistance to filtration and centrifuging as did the original wort. Such turbidity-causing substances, also have a distinct toxic action on the yeast.

(3): And again—and preferably, after the fermentation step. Sundry complex proteins are ordinarily found deposited from beer in the storage vats and kegs, showing that mere filtering, as heretofore commonly practised, does not avoid or remove the cause of gluten-turbidity, etc. My process following the fermentation largely avoids this evil.

I pass the liquids through the adsorption materials, advantageously first electropositive (such as corundum) and then electronegative (such as quartz) held in a suitable dielectric or insulated vessel or tube, and subjecting it therein during such passage to the alternating electric field. In cases such as beer and malt products where it is desired to retain emulsoid colloids in stable solution, the adsorption material I finally use is advantageously electronegative, in order to confer negative charges on such colloids to most advantageously protect the same against precipitation as long as the liquid is efficiently insulated. Conversely, there are sundry liquids, especially pharmaceutical, wherein it is desirable, for sundry reasons, to confer positive ions or charges upon its amphoteric colloids, and, in such cases, the final adsorption material to be used with my process, is advantageously electropositive, such as crushed abrasive garnet or corundum. Beers, liquid extracts, and the like made from the same species vary in their constitution, just as grapes grown in the same fields vary from year to year, and the specific treatment can readily be varied in accordance with the variations in the liquid to be treated.

After the liquid has been treated as herein described, and thereafter kept in insulated conditions,—any of the ordinary tests as to taste or quality or appearance or bouquet or turbidity or stability or chemical decomposition after placing in glass or other dielectric container, should disclose an unsatisfactory condition or state as regards such or other advantages herein described, then the process may be repeated and the rate or speed of passage of the liquid, through the electric field and adsorber, or alternating currents of more or less voltage or frequency or amperage, or a greater or lesser magnetic or other alternating electric field, or more or less adsorption material, or different kind of latter may be used, to overcome such objections.

In my application Serial No. 842327, filed June 1st, 1914, I have illustrated and described and claimed certain other types of apparatus, in which the novel process of the present invention can be practised. Such apparatus is generally similar to that of the present application, in that it comprises a body of a suitable comminuted solid adsorption material in an insulated container and receptacle for liquids or fluids, together with means for providing and maintaining in said receptacle or container, and the liquid therein, or passing therethrough, a suitable alternating electric field; but it is distinguished from the apparatus of the present application in that the field is induced, while the field of the present invention is a field between electrodes, such as is obtainable, for example between electrodes in a non-electrolytic cell. In my said prior application Serial No. 842327, I have also described and claimed the process of treating liquids by the combined influence of a body of comminuted solid adsorption material and an alternating electric field, the electric field however being limited in the amended specification to an induced field as distinguished from the field between electrodes, utilized in the embodiments of the invention specifically described and claimed in the present application; while in the present application, I claim such process generically for liquids and fluids together with the resulting novel product, the specific claims of said prior application being drawn to the treatment of grape juice and wine (ordinarily prepared without the heat of cooking,)—and to the novel resulting product.

In the present application, I have described my invention more particularly as applied to fermented beverages, (where cooking at high temperature is now used,) such as beers, which present peculiar difficulties in their purification, because of gluten-turbidity tendencies, etc., and which are by my process converted into a novel valuable product substantially freed from such turbidity-forming adsorbable colloids, such as suspensoids, while still containing the valuable non-adsorbable emulsiod colloids in stabilized condition, which have electrically adsorbed ions from the immersed adsorption material due to my process; such retained colloids having valuable nutritive or tonic properties.

In general, the apparatus and process of my said prior application embody equivalent or corresponding elements, but such different types of apparatus have their own particular advantages, due to the different alternating electric fields utilized and to the different arrangements of electrodes, etc.

In order to illustrate the invention more fully, I have illustrated on the accompanying drawings certain forms or constructions of apparatus embodying the invention and in which the process of the invention can be practised; but it is intended and understood that the invention is illustrated by, but it is not limited to the embodiments thereof so illustrated and described.

In these drawings, Figure 1 illustrates one form of apparatus embodying the invention; this type being what may be called a non-electrolytic cell, with electrodes. Fig. 2 shows a modified form of apparatus; which is also a vacuum receptacle for connection with the apparatus of Fig. 1. Fig. 3 shows in perspective the adsorption layer and electrodes of Fig. 2. Fig. 4 shows a modified type of apparatus; and Fig. 5 is a section taken on the line 1—2 of Fig. 4.

In the accompanying drawings, which illustrate, more or less diagrammatically, certain embodiments of the invention, Figs. 1 and 2 illustrate two forms of apparatus suitable for use together or separately. The apparatus of Fig. 1 is made up of a container or vessel A with dielectric lining A', said vessel being advantageously of glass or other suitable insulator or dielectric material. The vessel is shown as having an intermediate inwardly projecting ledge, supporting a perforated plate upon which is placed a layer $s''$ of relatively coarse material and then the main body $s$ of the comminuted adsorption material of the nature already described. A perforated plate $f$ at the top of the apparatus Fig. 1 serves as a distributing plate and for removing coarse particles from the incoming liquid or fluid. Below the body of adsorption material is a compartment for receiving the liquid or fluid from such body, this compartment being provided with a manhole P for cleaning purposes, etc.; with a tubular coil $w$ for introducing reverse stream of water or water and steam for cleaning; with a valve controlled outlet $b$ for drawing off the liquid, and with a second valve controlled outlet $e$ leading to the inlet $b'$ of the apparatus of Fig. 2. The outlets $b$ and $e$ are protected by a screen O of suitable construction for gathering sediment or flocculated or precipitated or suspended particles, etc., and preventing their escape. Within the body S of adsorption material are arranged two series of electrodes E and E' alternating with each other and each series being connected by suitable connections to bus bars G and G' connected with a suitable alternating current source as shown. An auxiliary electrode-like plate H over which the liquid passes is also arranged within the vessel of Fig. 1, above or below, or in the electric field and is connected to ground through an interrupter X which serves to complete the ground connection synchronously with the alternations of the current for the purpose above described. A tubular coil $c'''$ is provided for cooling or warming the apparatus and the contents thereof by means of a suitable heating or cooling circulating medium, and means of controlling and regulating same.

The apparatus of Fig. 2 is arranged to receive the liquid from the vessel Fig. 1, and to give such liquid a further treatment where such treatment is desired. This apparatus is made up of a container or receptacle D with dielectric lining D' having a removable cover and divided by the filtering or adsorption layer $s'$ arranged between perforated plates N, into two compartments $y$ and $y'$, the electrodes E and E' being arranged on opposite sides of said layer. The apparatus is provided with inlet connection $b'$, outlet $u$ and valve controlled outlet pipe V leading to a suction or vacuum providing means (not shown). A water gage $m$ is also shown.

In the apparatus of Figs. 4 and 5, the receptacle or container is made up of outer and inner casings T and T', with dielectric linings A and A' between which the body of adsorption material is placed. A cover, which may be removable, connects these casings at the top, the inner casing T' is supported also at the bottom by posts J from the outer casing. The body S of adsorption material is shown as supported much the same as in Fig. 1, and from the bottom of the apparatus outlets $b$ and $u$ are provided with suction connection V much the same as in Fig. 1. The lower part of the apparatus of Fig. 4, is however divided into two compartments $y$ and $y'$ corresponding to the compartments of the apparatus of Fig. 2, and a filter cloth O on adsorption layer $s'$ is provided but without any electrodes being shown. A second suction outlet connection is shown at V'. Surrounding the apparatus is a heating or cooling coil $c'''$ and a central coil $c''''$ is also provided, either or both of which may be used as desired. The electrodes E', $E^2$ and $E^3$ of Figs. 4 and 5 are arranged concentrically and oppositely as clearly illustrated, three sets of electrodes being shown for three phase current. The apparatus of Fig. 4 can also be connected with and operated with the apparatus of Fig. 2 similarly as may that of Fig. 1.

In the carrying out of the process of the present invention, in the apparatus described, the liquid or fluid to be treated is introduced through the perforated distributing plate $f$ of Fig. 1, or the inlet $e'$ of Fig.

4, and enters the body of adsorption material and the alternating electric field. The treatment may be intermittent, the liquid being alternately introduced and discharged, or the process may be continuous by properly regulating the inflow and outflow. The flow of liquid or fluid can be effected by gravity, or under pressure of a force pump or by suction, and the rate of flow can be regulated and controlled as desired as will be readily understood. By means of the heating or cooling coils, the liquid can be suitably attemperated as desired; 33 to 45 degrees F. being preferable for coagulating certain albumens, and 130 degrees F. being preferable for my electric adsorption of colloids and 176 degrees F. for incidental sterilization purposes. During the passage of the liquid through the adsorption material, it is subjected to the alternating electric field between electrodes in order to attain the above described effects. After such passage and treatment, the liquid can be drawn off at $b$, or passed through the second layer of adsorption material Fig. 2 and then drawn off at $u$. If the body of adsorption material $s$ is electropositive, the body $s'$ is advantageously electronegative, or vice versa, in order that the liquid may be subjected to such materials and opposite and complementary forces, successively, and a double adsorption effected accordingly. The adsorption material $s$ may be of comminuted corundum (generally electropositive) or comminuted quartz (generally electronegative) or material such as has already been described. The material $s'$ may advantageously be of asbestos or similar material and may in some cases serve merely as a filter and in others as an adsorption body under the influence of the electric field. Or $s'$ may be enlarged to a mass of comminuted adsorption material of opposite sign to $s$, in a readily understood vessel, not shown.

When any considerable accumulation of sediment, precipitations, flocculations, adsorptions, or solids has occurred in the lower body $s'$, the cover of the apparatus of Fig. 2 can be removed for cleaning purposes; or in the apparatus of Fig. 4 the fastener R' can be loosened, and the lower part of the apparatus swung around on the pivot R, and access obtained to asbestos or cotton cloths O and O' supported by dielectric perforated sieves and from which sediments and the like can be gathered by well known facilities, when such are to be saved. The outlet P of Fig. 1 similarly enables cleaning of the screen O. When the adsorption bodies or layers have become clogged or saturated, it may in some cases be necesasry to renew such bodies. In other cases the separated colloids can be dissolved by suitable solvents (acids, bases, etc.,) and removed. Where the adsorption materials have become saturated with adsorbed colloids which it is desired to obtain and separate, such materials may be suitably treated with solvents or otherwise to obtain such colloids.

The alternating current may be of any suitable frequency and amperage, advantageously of low frequency 16 to 25, and especially with induced alternating fields produced from any suitable source, either alternating current, of by suitable pole changers from direct current. It will be understood that high frequencies and voltages especially with A C field in the electrolyte cell type between electrodes may be more advantageous in some cases as with oils and low medium frequencies advantageously in others as with beer. It will also be understood that polyphase currents of various kinds can be used, Fig. 5 showing electrodes for three phase. These electrodes are shown as arranged concentrically in three sets with the inner electrode of one set opposite the outer electrode of the next set. It will be understood that the heating effect of currents may also be controlled by means of step-down transformers; or providing a resistor in the circuit; or providing frequency changers. The alternating electric field produced in the apparatus of the present invention is one between electrodes, as distinguished from analogously acting induced fields such as described and claimed in my above prior application. That is to say, the electrodes are arranged alternately or oppositely and create a narrow field between them to which the liquid being treated is subjected while passing over the adsorber loosely packed between the electrodes. Various arrangements of such electrodes can be effected, and in parallel or in series, as will be readily understood. The electrodes may be of any suitable material, preferably platinum or platinum-iridium or aluminum, or other metal advantageously covered with dielectric material such as glass, etc., which will not injuriously affect or be affected by the liquid, undergoing treatment. The apparatus of the present invention has the advantage that it is capable of wide application, and that the size can be varied within wide limits, as will be understood. By increasing the size of the electrodes or their number and by correspondingly increasing the size of the apparatus it is possible to use a large body of the adsorption material therebetween and to treat a correspondingly large body of liquid, while still maintaining the electrodes relatively close together and keeping the liquid and the adsorption material in thin layers therebetween. The receptacle and its connections should advantageously be insulated or advantageously made of glass or other insulating or dielectric material and the container into which the treated liquid is discharged should also advantageously be of such material,—in other words during and after said passage of the liquids, the latter should advantageously be maintained under insulated conditions.

Though I have described the treatment of the liquid by passing the same through the adsorption material, I do not restrict myself to thus operating while in the state of passage through the vessels, but may also attain the result sought, but with less quantity, by analogous treatment and means whereby the liquid is agitated in a dielectric vessel, in contact with solid comminuted adsorption material, in an alternating electric field,—and the ensuing periodical withdrawal therefrom and renewal thereof.

The liquid after treatment carries electric charges from the alternating current source and further enhanced by adsorption of ions by the emulsoids from the adsorption material,—the opposite charges due to polarization having been removed by the ground connection.

The adsorbed colloids or sediment-forming constituents may be retained by the adsorption material or they may be precipitated, aggregated, flocculated, agglomerated, or coagulated and thrown down in such form that they can be subsequently removed by settling or filtering or otherwise. The filter layer O over s' of Fig. 4 or the adsorption layer s' of Fig. 2 may effect such separation. After treatment the escaping liquid is advantageously placed in insulated containers such as bottles, etc., so that it will retain its electrified state. The liquid may in some cases be concentrated to a syrupy or even a solid consistency, or again the liquid may be of such nature that it will remain fluid, while hot but solidify on cooling, the adsorption treatment in the latter case being effected while the material is heated to fluidity. The material whether liquid or solid is generally characterized by containing the unadsorbable colloids such as the amphoteric colloids, and the emulsoids, which are not permanently adsorbed and permanently retained, being first attracted and then repulsed by the adsorption material; and by its freedom or substantial freedom from adsorbable colloids such as the suspensoid colloids which are non-amphoteric. Accordingly in the case of liquids treated by my process, such as beer or wine or other aqueous or alcoholic beverages or extracts the liquid, for example beer, may be substantially free from the objectionable turbidity-forming suspensoid colloids, while still containing the valuable emulsoid colloids; and particularly when freshly treated, the products will in general contain the colloidal constituents, the emulsoids with enhanced electric charges, and adsorbed ions and accordingly in an electrically stabilized condition; the said emulsoids carrying adsorbed ions obtained by physical, electric and adsorption means and not by chemical means such as result in new complex chemical compounds.

It will be understood that where a single treatment is not sufficient, the treatment can be repeated one or more times with the same or different adsorption materials and with different strengths and frequencies of current. The subsequent treatments may advantageously be through adsorption materials complementary to those first utilized in order to obtain the double adsorption action.

While I have illustrated and described certain specific forms of apparatus and have described the process in connection therewith, yet it will be understood that such illustration and description is intended to illustrate specific embodiments of the invention, and that variations and modifications can be made without departing from the spirit and scope of the invention.

I claim:

1. In the treatment of liquids and fluids, the process which consists in passing the liquids or fluids, under regulated pressure and temperature through a mass of comminuted, solid, suitable adsorption material which is electronegative in liquids and fluids of an acidic nature, and electropositive in liquids and fluids of a basic or of a neutral nature, and simultaneously subjecting the liquid or fluid to the action of an alternating electric field of regulated voltage, frequency and amperage, under insulated conditions, the same having a make and break electric connection to earth in synchronism with said current; and thereafter maintaining the liquids and fluids under insulated conditions.

2. In the treatment of liquids and fluids, the process which consists in passing the liquids or fluids, under regulated pressure and temperature through a mass of comminuted, solid, suitable adsorption material, which is electronegative in liquids and fluids of an acidic nature, and electropositive in liquids and fluids of a basic or of a neutral nature, and simultaneously subjecting the liquid or fluid to the action of an alternating electric field of regulated voltage, frequency and amperage.

3. In the treatment of liquids and fluids, the process which consists in passing the liquids or fluids, under regulated pressure and temperature through a mass of comminuted, solid, suitable adsorption material, which is electronegative in liquids and fluids of an acidic nature, and electropositive in liquids and fluids of a basic or of a neutral nature, and simultaneously subjecting the liquid or fluid to the action of an alternating electric field between electrode terminals from an alternating current source, of regulated voltage, frequency and amperage.

4. The process of treating liquids and fluids containing adsorbable colloidal constituents, which comprises, subjecting the same to the influence of an alternating electric field in the presence of a comminuted solid insoluble adsorption material.

5. The process of treating liquids and fluids containing adsorbable colloidal constituents, which comprises passing the same through a mass of solid insoluble comminuted adsorption material, and subjecting the same during such passage to the influence of an alternating electric field.

6. The process of treating liquids and fluids containing adsorbable colloidal constituents, which comprises passing the same through a mass of comminuted solid insoluble adsorption material in a non-conducting container, and subjecting the same during such passage to the influence of an alternating electric field.

7. In the treatment of liquids and fluids, the process which comprises passing the same through a mass of comminuted, solid, suitable, electrically-complementary adsorption material and subjecting the same during such passage to the influence of an alternating electric field.

8. In the treatment of liquids and fluids, the process which comprises passing the same through a mass of comminuted, solid, insoluble, suitable, adsorption material which is electrically-complementary to same and subjecting same during such passage to the influence of an alternating electric field under insulated conditions.

9. In the electrical treatment of liquids and fluids, the process which consists, in subjecting the same while in an electrified state from alternating current source, to the action of electrically-complementary adsorption material.

10. In the electrical treatment of liquids and fluids, the process which consists in subjecting the same while in an electrified state from alternating current source, to the action of electrically-complementary adsorption material under insulated conditions.

11. In the electrical treatment of liquids and fluids, the process which consists in subjecting the same to the influence of an alternating electric field while in contact with comminuted solid insoluble dielectric electrically-complementary adsorption material under insulated conditions.

12. In the electrical treatment of liquids and fluids, the process which consists in subjecting the same to the influence of an alternating electric field while in contact with comminuted solid insoluble dielectric electrically-complementary adsorption material under insulated conditions.

13. In the electrical treatment of liquids and fluids, the process which consists in subjecting the same to the influence of an alternating electric field while in contact with comminuted solid insoluble dielectric electrically-complementary adsorption material, the same having under insulated conditions, the same having a make and break electric connection to earth in synchronism with said alternating current.

14. In the electrical treatment of liquids and fluids, the process which consists in subjecting the same to the influence of an alternating electric field between terminal electrodes while in contact with comminuted solid insoluble dielectric electrically-complementary adsorption material.

15. In the treatment of liquids and fluids, the process which consists in subjecting the same to the influence of an alternating electric stress from alternating current source while in engagement with comminuted solid suitable dielectric adsorption material, and thereafter repeating the said step with adsorption material of an electric sign opposite to that thus previously used.

16. In the treatment of liquids and fluids, the process which consists in subjecting the same to the influence of an alternating electric stress between terminal electrodes from alternating current source while in engagement with comminuted solid suitable dielectric adsorption material, and thereafter repeating the said step with adsorption material of an electric sign opposite to that thus previously used, under insulated conditions.

17. In the treatment of liquids and fluids, the process which consists in subjecting same under insulated conditions, and in contact with comminuted solid insoluble electrically-complementary adsorption material, to the influence of combined multipolar electric fields from polyphase alternating current source.

18. In the treatment of liquids and fluids, the process which consists in passing the liquids under regulated pressure and temperature and insulated conditions, through a mass of comminuted, solid, suitable, electrically-complementary adsorption material, and simultaneously subjecting the liquid to the action of combined fields between terminal electrodes from polyphase alternating current source, of regulated voltage, frequency and amperage, the same having a make and break electric connection to earth in synchronism with said current; and thereafter maintaining the liquids under insulated conditions.

19. In the treatment of liquids containing adsorbable colloids the process which consists in subjecting the liquid to the influence of an alternating electric field while in contact with a comminuted solid insoluble adsorption material having an electrical charge, when immersed in said liquid, opposite to that of the colloids contained in said liquid.

20. In the electrical treatment of beer, malt extract and the like, the process which consists in subjecting the same to the influence of an alternating electric field while in contact with comminuted solid insoluble dielectric electrically-complementary adsorption material under insulated conditions.

21. In the electrical treatment of beer, malt extract and the like, the process which consists in subjecting the same to the influence of an alternating electric field between terminal electrodes from A. C. source, while in contact with comminuted solid insoluble dielectric electrically-complementary adsorption material under insulated conditions.

22. In the treatment of liquids and fluids, the process which consists in passing the liquids under regulated pressure and temperature and insulated conditions, through a mass of comminuted, solid, suitable, electrically-complementary adsorption material, and simultaneously subjecting the liquid to the action of combined fields between terminal electrodes from polyphase alternating current source, of regulated voltage, frequency and amperage, the same having a make and break electric connection to earth in synchronism with said current; and thereafter repeating said step with adsorption material of opposite sign; and thereafter maintaining and packaging the liquid under insulated conditions.

23. In the making of beers, the process of passing the liquids through a mass of comminuted solid inert dielectric adsorption material, packed loosely in an insulated vessel between sets of inert large plate electrodes constituting the terminals of independent alternating currents simultaneously in operation, of a polyphase system, and after such passage of the liquid maintaining the same in insulated vessels and dielectric containers.

24. In the treatment of beer, the process which consists in subjecting the beer, before and again after the fermentation, and after finishing the wort thereof, to contact with a comminuted solid dielectric suitable complementary adsorption material, in an electric field from alternating current source, under insulated conditions.

25. In the treatment of beer, the process which consists in subjecting the beer, before and again after the fermentation, and after finishing the wort thereof to contact with a comminuted solid dielectric suitable complementary adsorption material, in an electric field from alternating current source, under insulated conditions, the beer having a make-and-break electrical connection to earth in synchronism with said alternating current.

26. In the treatment of liquids and fluids, the process which comprises passing the same under regulated pressure and temperature through a mass of comminuted solid insoluble electrically-acting and complementary adsorption material, and subjecting the same during such passage to the influence of an alternating electric field, of regulated voltage, frequency and amperage, under insulated conditions; and thereafter passing the liquid or fluid under regulated pressure and temperature through large amounts of solid insoluble mechanically-acting adsorption material, under non-insulated conditions.

27. In the treatment of liquids and fluids, the process which comprises passing the same under regulated pressure and temperature through a mass of comminuted solid insoluble electrically-acting and complementary adsorption material, and subjecting the same during such passage to the influence of an alternating electric field, of regulated voltage, frequency and amperage, under insulated conditions, and beyond said electric field, the said liquid or fluid having a make-and-break connection to earth in synchronism with said alternations; and thereafter passing the liquid or fluid under regulated pressure and temperature through large amounts of solid insoluble mechanically-acting adsorption material, under non-insulated conditions.

28. In the treatment of liquids and fluids, the process which comprises passing the same under regulated pressure and temperature through a mass of comminuted solid insoluble electrically-acting and complementary adsorption material, and subjecting the same during such passage to the influence of an alternating electric field, of regulated voltage, frequency and amperage, under insulated conditions; and thereafter passing the liquid or fluid under regulated pressure and temperature through surfaces and large masses of loose cellulose, under non-insulated conditions.

29. In the treatment of liquids and fluids, the process which comprises passing the same under regulated pressure and temperature through a mass of comminuted solid insoluble electrically-acting and complementary adsorption material, and subjecting the same during such passage to the influence of an alternating electric field, of regulated voltage, frequency and amperage, under insulated conditions; and thereafter passing the liquid or fluid under regulated pressure and temperature through large amounts of solid insoluble mechanically-acting adsorption material, under non-insulated conditions; and thereafter gathering from such adsorption materials, the precipitations, aggregations, flocculations, coagulations and adsorptions thereon.

30. In the treatment of liquids and fluids containing adsorbable colloidal constituents, the process which comprises passing the same under regulated pressure and temperature through a mass of solid insoluble electrically-acting complementary adsorption material and subjecting the same during such passage to the influence of an alternating electric field under insulated conditions, and thereafter gathering from the adsorption material the substances adsorbed, precipitated, flocculated, and coagulated thereon and thereby.

31. An apparatus of the nature described, comprising a chamber holding a mass of suitable comminuted solid insoluble adsorption material, and means for maintaining in said chamber and mass an alternating electric field.

32. An apparatus of the nature described, comprising a chamber holding a mass of suitable comminuted solid insoluble dielectric adsorption material, means for effecting a flow of liquid and fluid therethrough, and means for maintaining in said chamber and mass an alternating electric field.

33. An apparatus of the nature described, comprising an insulated chamber holding a mass of comminuted solid, inert, suitable adsorption material in a non-conducting container provided with inlet and outlet for liquid and fluid, and means for maintaining in said chamber an alternating current field.

34. An apparatus of the nature described comprising an insulated vessel holding a mass of comminuted solid, electrically-acting adsorption material; means for maintaining a combination of electric fields independently within said vessel, from polyphase alternating current source, regulated as to voltage and frequency and amperage; means for maintaining a flow of liquids or fluids through the adsorption material in the electric fields at regulated pressure and temperature; means for electrically connecting the said liquids or fluids to earth through an interrupter, making and breaking earth connection in synchonism with each cycle of said current; means for conveying the liquids in dielectric piping into and from said vessel into dielectric receptacles; and means for periodically cleansing said vessel and adsorption material.

35. In the electrical treatment of liquids and fluids the apparatus comprising a vessel consisting of two concentric dielectric tubes with annular space between same holding a loosely packed mass of comminuted solid dielectric, inert, suitable adsorption material between terminal electrodes; means of passing liquids or fluids under regulated pressure and at regulated temperature through said adsorption material between electrodes under insulated conditions, and into connecting insulated receptacles; means for maintaining within said annular space, during said passing of the liquids, and combined electric fields between said terminal electrodes from polyphase alternating current source, the terminal electrodes of one circuit facing the terminals of another circuit; means for electrically connecting the said liquid or fluid to earth through an exterior insulated interrupter making and breaking earth connection in synchronism with each cycle of said A. C.; and means for periodically cleansing said vessel and adsorption material.

36. An apparatus of the nature described, comprising a chamber consisting of two insulated parallel vessels having a narrow space therebetween; a mass of comminuted solid, insoluble suitable adsorption material between electrodes in said chamber; means of passing liquids or fluids under regulated pressure and at regulated temperature through said adsorption material and chamber under insulated conditions, and into connecting insulated receptacles; means for maintaining within said space, during said passing of the liquids, combined electric fields between terminal electrodes from alternating current source; and means for periodically cleansing said vessel and adsorption material, and means for removing and gathering therefrom adsorptions, precipitates, aggregations, flocculations and coagulations.

37. An apparatus of the nature described comprising an insulated vessel holding a mass of comminuted solid, suitable electrically-acting adsorption material between electrode terminals; means for maintaining within said vessel an alternating electric field between said electrode terminals from alternating current source regulated as to voltage and frequency and amperage; means for maintaining a passage of liquids or fluids through such adsorption material and electric field at regulated pressure and temperature.

38. An apparatus of the nature described comprising a narrow insulated vessel holding a mass of comminuted solid, insoluble, suitable, electrically-acting adsorption material between electrodes; means for maintaining within said vessel an alternating electric field of force between terminal electrodes from alternating current source regulated as to voltage and frequency and amperage; means for maintaining a passage of liquids or fluids through such adsorption material and electric field, at regulated pressure and temperature.

39. An apparatus of the nature described, comprising a narrow insulated vessel holding a mass of comminuted solid, insoluble, suitable, electrically-acting adsorption material between electrodes; means for maintaining within said vessel an alternating electric field of force between terminal electrodes from alternating current source regulated as to voltage and frequency and amperage; means for maintaining a passage of liquids or fluids through such adsorption material and electric field, at regulated pressure and temperature; an electric make-and-break earth connection from said liquids or fluids in synchronism with said alternating current; means for periodically cleansing said vessel and adsorption material, and means for gathering precipitations, aggregations, flocculations, concentrations and adsorption of substances from within said vessel.

40. The apparatus comprising an insulated vessel holding comminuted solid insoluble dielectric suitable adsorption material, loosely packed between sets of inert plate electrodes, a terminal electrode of one set facing the like terminal electrode of another set, each set of electrodes being connected with the terminals of different circuits of a polyphase system of independent symmetrical alternating currents; means of passing a liquid or fluid rapidly under pressure through said adsorption material; means of creating, collecting and carrying to said electrodes the said polyphase currents during said passage; means of electrically connecting the liquid to earth while being passed through said electric fields through an exterior interrupter making and breaking earth connection synchronously with said alternating current; means for periodically cleansing said electrodes and adsorption material and vessel, and means for gathering adsorptions and precipitates, aggregations, flocculations, coagulations and the like from said materials and vessel.

41. The apparatus comprising the combination of an insulated vessel; terminal electrodes and intermediate electrodes, arranged in parallel, with narrow space between adjacent electrodes and with comminuted solid adsorption material between all electrodes; with means of passing a liquid or fluid under pressure continuously through said adsorption material into a dielectric receptacle; the terminal electrodes during said passage being connected with the terminals of a symmetrical alternating current of regulated voltage and frequency and amperage; with means for attemperating said vessel and contents during said passage to between 33 degrees F. and 176 degrees F.; and means for permitting the periodical cleansing of said electrodes and material and vessel, and the gathering of adsorptions, aggregations, precipitates, flocculations and coagulations therefrom.

42. As a new product a stabilized electrically charged liquid, containing therein with enhanced electric charges, colloidal constituents, non-adsorbable by a comminuted solid insoluble adsorption material under the influence of an alternating electric field, and being substantially free from colloidal constituents adsorbable by such material under such influence.

43. As a new product a liquid containing amphoteric colloidal constituents and substantially free from adsorbable colloidal constituents.

44. As a new product a liquid containing emulsoid colloidal constituents but substantially free from adsorbable suspensoid colloidal constituents.

45. As a new product an electrically charged liquid under insulated conditions containing amphoteric colloidal constituents and substantially free from adsorbable colloidal constituents.

46. As a new product, a beer, malt extract, and the like, containing amphoteric colloidal constituents and substantially free from adsorbable colloidal constituents.

47. As a new product, a beer, malt extract, and the like, containing amphoteric colloidal constituents carrying electric charges under insulated conditions and substantially free from adsorbable colloidal constituents.

48. As a new product, a liquid freed from suspensoid colloids and comprising emulsoid colloids electrically charged with adsorbed ions, under insulated conditions.

49. As a new product, a beer freed from turbidity-forming colloids and comprising emulsoid colloids electrically charged with adsorbed ions, under insulated conditions.

50. As a new product a stabilized electrically charged substance, containing therein with enhanced electric charged, colloidal constituents, non-adsorbable by a comminuted solid insoluble adsorption material under the influence of an alternating electric field, and being substantially free from colloidal constituents adsorbable by such material under such influence.

51. As a new product a substance containing amphoteric colloidal constituents and substantially free from adsorbable colloidal constituents.

52. As a new product a substance containing emulsoid colloidal constituents but substantially free from adsorbable suspensoid colloidal constituents.

53. As a new product an electrically charged substance under insulated conditions containing amphoteric colloidal constituents and substantially free from adsorbable colloidal constituents.

54. As a new product, a stabilized liquid containing in solution amphoteric colloids carrying charges of electrically-adsorbed ions.

55. As a new product a substance containing therein amphoteric colloids charged with electrically-adsorbed ions.

56. As a new product, a liquid containing in solution amphoteric colloids carrying charges of electrically-adsorbed negative ions.

57. As a new product, a beer containing in solution amphoteric colloids carrying charges of electrically-adsorbed negative ions.

In testimony whereof, I have affixed my signature in the presence of two witnesses.

JACOB E. BLOOM.

Witnesses:
R. R. WAITE,
F. E. BARROWS.